(12) United States Patent
Melnick et al.

(10) Patent No.: US 6,348,959 B1
(45) Date of Patent: *Feb. 19, 2002

(54) REFLECTIVE LCD WITH DARK BORDERS

(75) Inventors: George A. Melnick, Montrose; Ronald D. Pinker, Peekskill, both of NY (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,409

(22) Filed: Dec. 21, 1998

(51) Int. Cl.⁷ .................. G02F 1/1333; G02F 1/1339
(52) U.S. Cl. .................. 349/110; 349/111; 349/153
(58) Field of Search .................. 349/110, 111, 349/153

(56) References Cited

U.S. PATENT DOCUMENTS

| | | | |
|---|---|---|---|
| 4,647,156 A | * 3/1987 | Fujimura et al. | 349/153 |
| 4,810,061 A | * 3/1989 | Nakanowatari et al. | 349/111 |
| 5,037,185 A | * 8/1991 | Grupp | 349/153 |
| 5,459,598 A | * 10/1995 | Carrington | 349/156 |
| 5,490,003 A | 2/1996 | Van Sprang | |
| 5,517,344 A | * 5/1996 | Hu et al. | 349/153 |

FOREIGN PATENT DOCUMENTS

| | | | | |
|---|---|---|---|---|
| EP | 0 338 412 | * 10/1989 | | 349/110 |
| JP | 59-44027 | * 3/1984 | | 349/110 |

* cited by examiner

*Primary Examiner*—William L. Sikes
*Assistant Examiner*—Tarifur R. Chowdhury
(74) *Attorney, Agent, or Firm*—Ernestine C. Bartlett (57) ABSTRACT

A projection display device is provided which includes a border structure comprising a dam around the active display area of the device which both shields any underlying drive circuitry from the incidental light by reflecting this light-while passively controlling its birefringence such that this region appears dark to the viewer when no drive voltages are being applied. Preferably, the dam is positioned between the glue seal and the active region, the thickness of the dam being such as to allow a thin layer of LC material on top of the dam for compensated LC effects and in such case, the border structure between the glue seal and the active region is also effective to keep the glue from seeping into the active region when the seal line is squeezed during assembly. With a high birefringence material and an external compensation foil, a high degree of light extinction is achieved over the border. Also, formation of the border on the active plate means that no critical alignment of the passive plate is needed.

38 Claims, 4 Drawing Sheets

REFLECTIVE LCD WITH DARK BORDERS

FIELD OF THE INVENTION

This invention relates to silicon based reflective liquid crystal displays (LCDs) and projection devices comprising a light source, such LCDS having a layer of liquid crystalline material between a first and second substrate which may be provided with orientation means, preferably the molecules of the liquid crystalline material having a twist angle $\phi$, means for guiding light from the light source to the first substrate, the second substrate being provided with means for reflecting light passing the layer of liquid crystalline material, said projection device further comprising polarizing means in the light path between the light source and the first substrate and analyzing means in the light path, after reflection, between the liquid crystal display device and a display plane.

BACKGROUND OF THE INVENTION

Silicon based reflective LCDs are potentially the most cost effective solution for high performance, high resolution digital projection in both the business and consumer markets. To maintain this cost effectiveness, a single panel approach is desirable. Reflection offers an advantage to this approach because LCDs can be made thinner and faster, thus offering the brightness and color quality expected in the high performance market via the single panel approach. LC effects which can switch to dark as fast as possible are desirable for single panel operation because they can block the unwanted colors during scanning most effectively with minimal use of dark regions between the scanning colors (guard bands). This results in high color purity and higher brightness when compared with slower responding devices, such as transmissive LCDS. The physical properties of liquid crystals imply that the electric field applied transition should be to a dark state in order to meet this requirement. Thus, optimally, all candidate effects should be "normally white", i.e., fully transmissive with no field applied. This means that with the highest voltage on the electrodes, no light is directed to the viewer from these areas/pixels and therefore they appear dark.

Normally white LC effects can be separated into two different categories: those requiring external foil compensation and those which do not require external foil compensation. A disadvantage of both categories, however, is that areas of inactivity (passive regions where no voltage can be applied) in the border of the display device appear bright.

Furthermore, it may be desirable to integrate driving electronics into the silicon immediately outside the active area. These areas must be shielded from light in order to function properly. A simple layer of aluminum above these circuits would most effectively shield them from light but this layer would act as a mirror reflecting most of the incident flux directly to the viewer with a "normally white" LC effect. Certain precautions have been recommended to render these areas dark to the viewer, for example, by replacing the aluminum with a black chromium layer. This requires an extra masking step which makes the display more expensive, while it also adds difficulty to the process of coupling the two substrates. Furthermore, chromium is not a commonly used material in silicon processing as it can render circuitry inoperable due to contamination.

Such a light absorbing mask could be used on the passive plate, but then it must be critically aligned to the active region of the silicon chip. Additionally, in order to absorb sufficiently, a minimum thickness of material is required and as such will have to be compensated for in order to maintain uniformity in a thin cell gap. Furthermore, the light energy absorbed will be converted to a significant amount of heat under the intensities expected in any projection system.

There is a need in the art for rendering these undriven display regions dark with a normally white LC effect in which these disadvantages are obviated as much as possible while still effectively shielding any underlying circuitry from the incident light.

SUMMARY OF THE INVENTION

An object of this invention is to provide a display device which uses a normally white LC effect that is free of or in which the above-described disadvantages are obviated as much as possible.

Another object of the invention is to make the regions that integrate driving electronics into the silicon immediately outside the active area appear dark to a viewer while still offering effective light shielding for the underlying circuitry.

Another object of the invention is to provide a display device, for use in reflection, that is provided with a border structure around an active display area, said border being effective to shield areas of said display device from incident light and to render said shielded areas dark to a viewer in the non-driven state.

These and other objects of the invention are accomplished by the provision of a projection display device, according to one embodiment of the invention, which comprises a layer of liquid crystalline material between a first and a second substrate, which substrates are optionally and preferably provided with orientation means and the molecules of the liquid crystalline material optionally and preferably having a twist angle $\phi$, means for guiding light from the light source to the first substrate, the second substrate being provided with means for reflecting light passing the layer of liquid crystalline material, preferably a pixel array active area of said substrate, said projection device further comprising polarizing means in the light path between the light source and the first substrate and, optionally and preferably, analyzing means in the light path, after reflection, between the liquid crystal display device and a display plane,     wherein a portion of the liquid crystalline material is displaced by a dam comprising a substantially transparent, non-birefringent material such as $SiN_x$, said dam forming a border, preferably, a substantially continuous border which substantially surrounds the pixel array active area of the display device, and wherein, most preferably, the liquid crystal display device is provided with a retardation foil or other compensation device, substantially all areas of said display device being dark in a non-driven state without absorbing substantial energy of the incident light flux.

As used herein, the phrase "non-driven state" means any voltage below the threshold for reorientation of the liquid crystalline material that is applied across the cell gap.

In another embodiment of the invention, there is provided a projection display device which comprises at least one light source whose light is incident on a display device as described hereinabove and is reflected dependent on the optical state of pixels defined by picture electrodes surrounded by a substantially continuous border comprising a dam of non-birefringent material, the light thus modulated being imaged by projection means, the areas situated between the electrodes and also other non-switching areas, for example, electronics integrated along the edge of the picture sections of said display device, being effectively shielded from the incident light yet appearing substantially dark in the non-driven state.

Thus, the invention involves the concept of a dark border employing a non-birefringent material on the active plate, around the active matrix of the reflective LC display device, and the use of LCDs comprising such borders. The border may be formed from a "dam" of any non-birefringent material, preferably a photodefinable spacer material already patterned or otherwise provided on the active plate. Preferably, the thickness of the dam is such as to allow a thin layer of LC material on top of the dam, and most preferably, the border structure shields the areas of underlying circuitry between the glue seal and the active region.

By design, this border has proven effective for both foil compensated and non-foil compensated effects.

As stated hereinabove, the invention is particularly suitable for devices using a "normally white LC mode" in which, in the non-driven state, not only the picture electrodes reflect light but also the structures and light shield material situated between and around the picture electrodes, so that extra steps have heretofore been required to render this interpositioned material invisible. Such normally white LC modes can usually be separated into two different categories: those requiring external foil compensation and those which do not require external foil compensation. The following Table lists some of these display devices;

TABLE

| DISPLAY | FOIL | DESCRIPTION |
| --- | --- | --- |
| 63TN0 | Yes | 63° Twisted cell, 0° polarizer angle |
| 60TN30 | No | 60° twisted cell, 30° polarizer angle |
| ECB | Yes | Homogeneous cell, 45° polarizer angle |
| HAN | Yes | Same as ECB but homeotropic alignment on one side |
| 90TN20 | No | 90° twisted cell, 20° polarizer angle |
| LTNs | Yes | 30°–75° twisted cells, 0° polarizer angle |

For purposes of discussion and illustration of the invention, the invention will be illustrated in terms of the normally white device 45TN0, however any and all of the above devices may be used in this invention.

For example, such effects and devices may be used as described in commonly assigned U.S. Pat. No. 5,490,003 of Van Sprang, issued Feb. 6, 1996. According to the Sprang patent, a substantial extinction of the light is obtained in the dark state by controlling the orientation directions of the LC alignment layers (orientation means) with respect to the direction of polarization of the polarizing means (the direction of the polarization is along the direction of the bisecting line between the LC orientation directions). A range of twist angles between 50 and 68 degrees and a product (d.$\Delta$n) of the thickness d of the layer of liquid crystal material and the birefringence $\Delta$n of the liquid crystal material within the range of 0.58 $\lambda_0$ and 0.68 $\lambda_0$, in which $\lambda_0$ is a central wavelength, can be used for a good contrast. Additionally, the difference in optical path length, after reflection, between the ordinary and the extraordinary wave is approximately 0.5 $\lambda_0$ for the two extreme transmission states and the reflective liquid crystal display device functions as an electrically controllable quarter-lambda plate.

Other devices as described in commonly assigned EPO 97201795.8, published December, 1998 have been found to be especially useful in this invention. According to EPO 97201795.8, the reflective display device uses a twist angle having a value between 30 and 55 degrees and a retardation foil, which makes it possible to reduce the drive voltage while maintaining high contrast. The "residual transmission" in a fully driven display element is compensated by the retardation value of the foil, which permits a smaller thickness d so that the device switches more rapidly. By choosing the orientation direction of the liquid crystal molecules on the side of the polarizing means to be substantially parallel to the direction of polarization of the incident light, or by choosing this orientation direction to be perpendicular to the direction of polarization, it is only necessary to compensate for the birefringence due to a non-reorientable surface layer of LC on the side of the reflecting means. Also, the angle $\lambda$ between the optical axis of the retardation foil and the orientation direction of the orientation means at the area of the first substrate may vary between, for example, $80\pm\phi/2$ degrees and $100\pm\phi$ degrees.

The disclosures of said U.S. Pat. No. 5,490,003 and EPO 97201795.8 are hereby incorporated into the present disclosure by this reference thereto.

As discussed hereinabove, when a normally white LCD is rendered dark, there are areas of inactivity ("no voltage applied") in the border regions of the display which remain white. The present invention in its most preferred embodiments provides a border structure comprising a dam around the active display area of the LCD to render areas of inactivity in the border area dark at all times. Preferably, the dam is positioned between the glue seal and the active region, the thickness of the dam being such as to allow a thin layer of LC material on top of the dam. In such case, the border structure is also effective to keep the glue from seeping into the active region when the seal line is squeezed during assembly. With a high birefringence LC material and an external compensation foil, a high degree of light extinction is achieved over the border. Also, formation of the border on the active plate means that no critical alignment of the passive plate is needed.

The invention thus provides a display device which uses a normally white LC effect and a method for rendering non-driven regions of a normally white LC effect dark and which is characterized by the following advantages:

1. a high degree of light extinction;
2. low to no light absorption;
3. a critical alignment of the passive plate is not required;
4. no additional cell processing steps are required to achieve a dark border;
5. a highly effective ionic contamination barrier between the active region and the edge seal region of the LCD is provided; and
6. the LC in said region cannot be reoriented by electric fields normally applied which would reduce the extinction of said border.

DETAILED DESCRIPTION OF PREFERRED EMBODIMENTS

Figure 1:
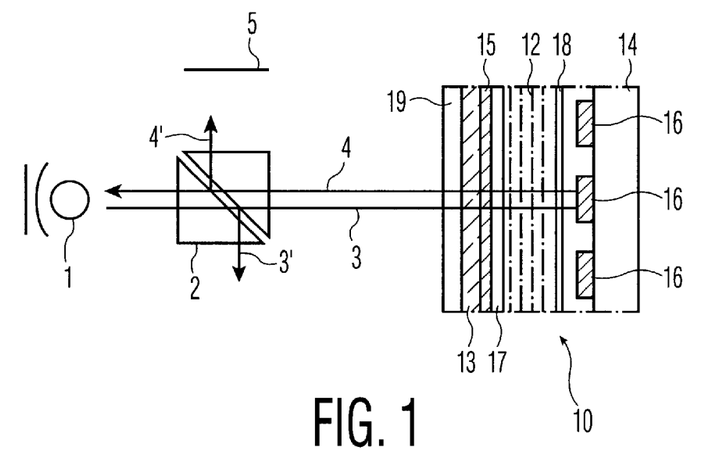
FIG. 1 is a diagrammatic cross-section of a portion of a projection display device according to an embodiment of the invention.

With reference to FIG. 1, the projection device comprises a lamp 1, a polarizing beam splitter (PBS) 2, a reflective liquid crystal cell (LCD) 10 and a display screen 5. Light emitted by the lamp 1 is split by the PBS 2 into a beam 3 of horizontally polarized light and a beam 3' of vertically polarized light. The beam 3 reaches the reflective LCD 10 and is reflected thereon. Dependent on the state of the separate pixels in the LCD 10, the reflected beam 4 comprises elliptically polarized light. The PBS 2 splits the beam 4 into its horizontal and vertical polarized components. The vertically polarized component, light beam 4', reaches the display screen 5. Further optical elements and drive units are omitted for the sake of simplicity. FIG. 1 shows a further diagrammatic cross-section of a part of a liquid crystal cell 10 with a twisted-nematic liquid crystal material 12 which is present between two substrates 13, 14 provided with the electrodes 15, 16, The device further comprises orientation layers 17, 18 which orient the liquid crystal material on the inner walls of the substrates in such a way that the cell has a twist angle φ. In this case, the liquid crystal material has a positive optical anisotropy and a positive dielectric anisotropy. If the electrodes 15, 16 are energized by means of an electric (drive) voltage, the long axis of the molecules (the molecular director) direct themselves to the field. The first substrate 13 is light-transmissive (glass or quartz) and is provided with a light transmissive drive electrode 15 of, for example indium tin oxide. The second substrate 14 consists of a silicon substrate in which drive electronics are realized by semiconductor techniques so that the separate pixels 16 can be driven. The (mirroring) picture electrodes 16 substantially completely covers the semiconductor body, at least in the picture-defining part.

If desired or necessary, to compensate for the residual birefringence of said dark state, the display cell 10 also comprises a retardation foil 19.

Figure 2A:
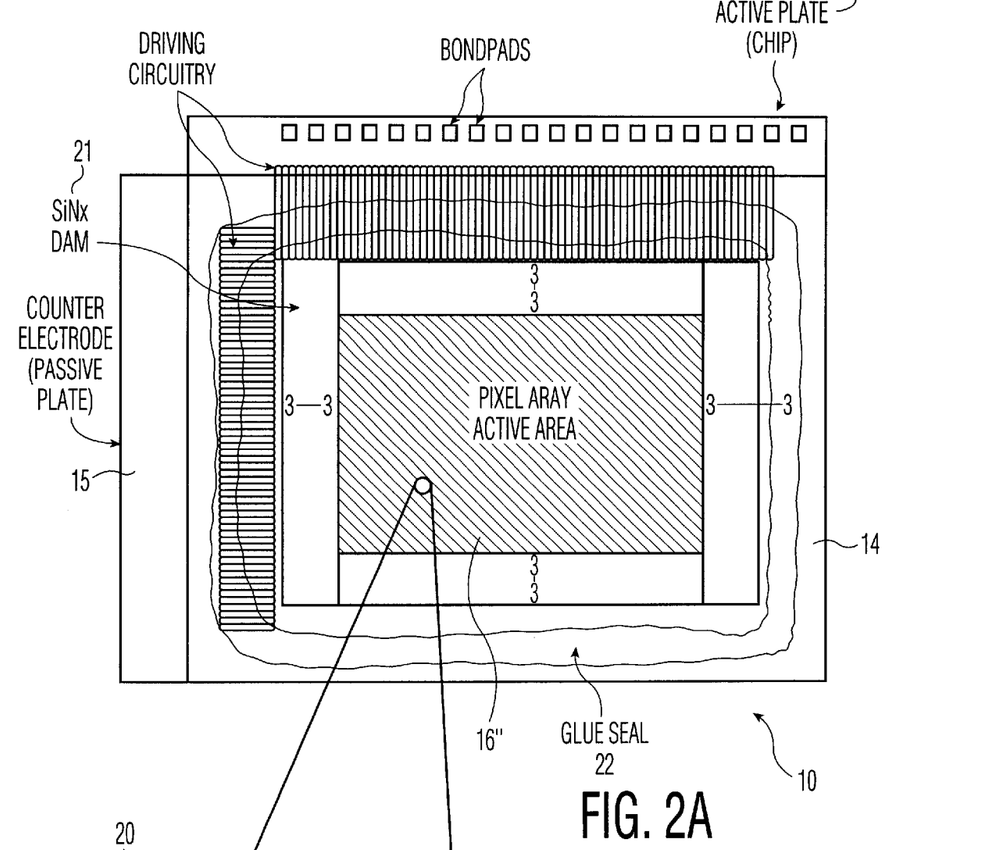
FIG. 2A is a top view of a reflective display device according to an embodiment of the invention.
Figure 2B:
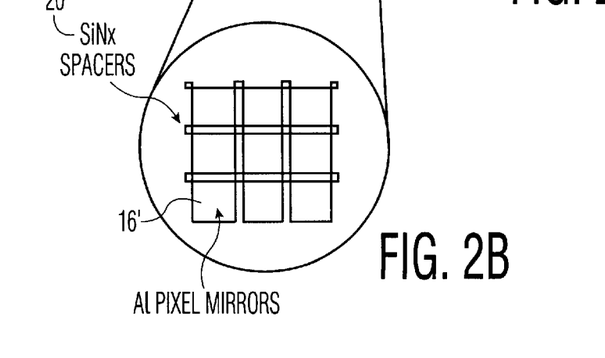
FIG. 2B is a view with parts blown up, of the reflective display device of FIG. 2A.
Figure 3:
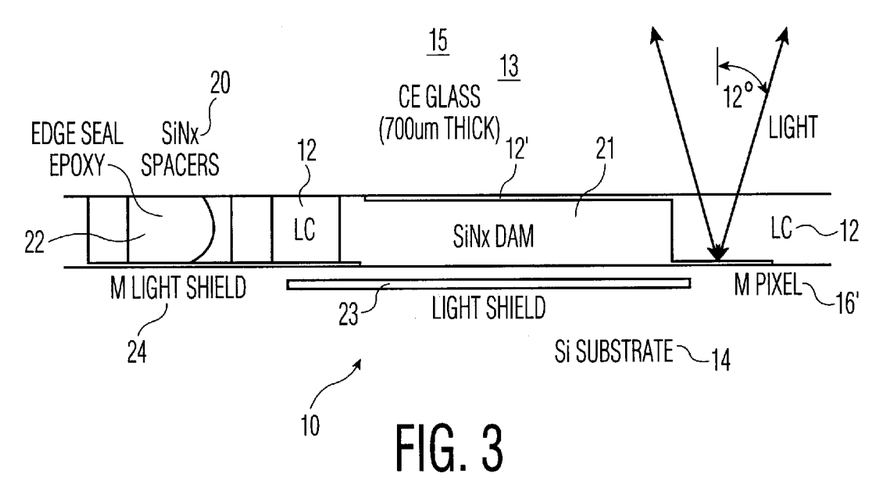
FIG. 3 is a sectional view of a portion of the display device of FIG. 2 at the border of the active area taken along line 3—3 of FIG. 2.

As illustrated, especially in FIGS. 2 and 3, a reflective LCD of the invention may have a structure wherein a patterned reflective pixel array active area 16, on which electrodes consisting of, for example aluminum, and used as light reflecting films for each pixel 16', is formed on a silicon substrate 14. Spacers 20 of $SiN_x$ or other suitable spacer material are formed between the pixels 16' using techniques known in the art. Surrounding the pixel array active area 16" is a border 21 comprising a dam of said spacer material, preferably the same spacer material as that formed between the pixels. The substrate is further covered with a polyimide orientation layer 18. A counter substrate such as a glass substrate 13 is covered with a patterned transparent conductor such as indium tin oxide to form a counterelectrode 15 which is covered with another polyimide orientation layer 17. The two substrates are sealed together using a glue seal 22 with the polyimide layers on the inner side of the cell. Preferably, a UV curable glue is utilized although other adhesives known in the art such as thermosetting epoxies may also be used. The gap between the substrates is maintained as desired by the spacers. In this example, before assemblage, the alignment layers were rubbed in such a way that a twist angle for the LC material of 45° was obtained. The test cell was filled under vacuo with the liquid crystal material, for example TL-210. To this cell, a uniaxial retardation foil at proper orientation was applied.

According to the invention, the border region is made dark by taking advantage of the polarizing beam splitter by reflecting back the proper polarization such that the light from the border region will not be directed to the viewing screen. This reflected light unwanted at the screen must be sufficiently converted into the proper polarization such that, optimally, the extinction is equal to or better than that of the dark state of the LCD active region. We have found that a wide dam surrounding the active region is capable of performing these functions when formed as shown in this example and illustrated in FIG. 3.

As will be appreciated, in such a border, a spacer of a material that is non-birefringent such as ($SiN_x$), ($SiO_x$), TEOS, P-TEOS, etc. displaces a portion of the liquid crystal material. Such a material in the dam region is transparent and light will pass through the dam to be reflected from the underlying Al light shield protecting further underlying drive circuitry from the incident flux. This is represented in FIG. 3 for a f2.5 optical system in which the counter electrode 15 or passive plate in this example is 700 um thick (standard Corning 0.028" glass). So as not to mask light incident on the pixel at the very edge of the active area, the external mask 25 is placed a minimum of 150 um horizontally from this pixel 16'. A dam 21 of 300 um easily accommodates this requirement without any necessity of performing critical alignment.

FIG. 3 also shows the effective use of a wide dam 21 with a liquid crystal effect 10 that requires an external compensation foil 19. The light shielding of the underlying drive circuitry is accommodated by two metal layers, the mirror metal (24) and routing metal (23). Signal lines driving the pixels are routed in another metal (not shown) below this region. This configuration is most effective with compensated effects because, by design, there is a thin layer of liquid crystal material 12' above the dam 21 between the dam and the counterelectrode 15. Spacers 20 in the gasket region beyond the dam 21 are patterned on top of the light shield 24 where the dam 21 is not present. This results in a higher spacing in this region equal to the thickness of the mirror metal light shield 24 (usually between about 1000 A and 1500 A). The counterelectrode glass 13 does not bend into contact with the dam 21 over its width resulting in this thin layer of LC 12' above the dam. In any twisted configuration the optical phase shift offered by this thin layer 12' is nearly equal to the residual birefringence of the field applied dark state in the active region. This means the same compensation foil which is used to compensate the actively driven LC to extinction will also make this border area dark.

Figure 4A:
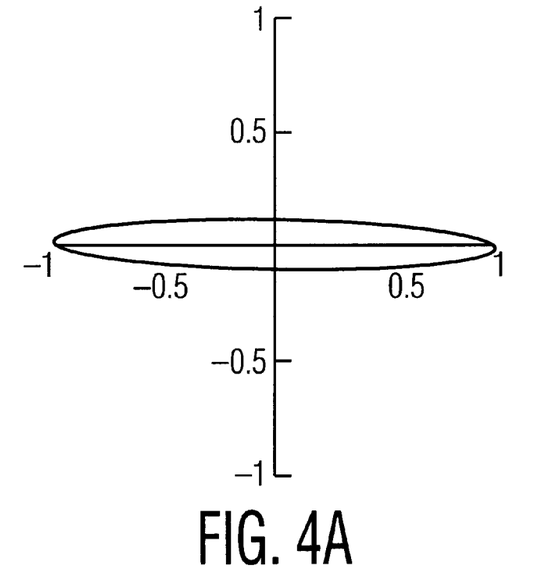
FIG. 4A is a graph of the reflected polarization ellipse for a 1500 A layer of liquid crystal material in a 45° twisted LTN.
Figure 4B:
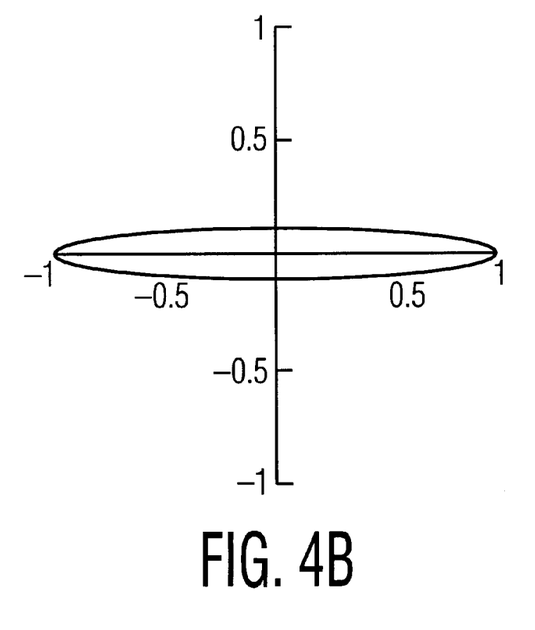
FIG. 4B is a graph of the reflected polarization ellipse for a 1 um 45° LTN driven at approximately 6V.

FIG. 4A shows the reflected polarization state of a 1500 A layer of a typical LC material in a 45° twisted LTN and FIG. 4B shows the reflected polarization from the same material in a 1 um cell gap under approximately a 6V driving field. Both polarizations are of the same sense (handedness), in this case, left-handed polarized light. An effective ellipticity of 0.11 was calculated for both of these conditions. The two polarizations differ only in the angle of rotation achieved by the polarization. In the case of FIG. 4A, for the 1500 A 45° twisted LTN, an effective rotation of 0.66° is achieved as compared with essentially no rotation in the 6V driven 1 um gap. A single foil will compensate both sufficiently to linearly polarized light that near perfect extinction is achieved at the polarizing beam splitter.

These calculations have shown that because the residual birefringence of the driven dark state is small (10–50 nanometers), a thin layer of LC of virtually any twist angle above the dam region 21 can be designed with nearly equal birefringence for a large variety of twist angles and dark state driving voltages. Similarly, normally white self compensating effects which do not have an external optical foil such as foil 19 in this example to compensate any residual birefringence can have a dark border design by not allowing for any liquid crystalline material above the dam. In this case, the dam is not stepped above the mirror metal light shield, i.e. in this case, the dam does not extend over the mirror metal light shield. All LC effects listed in Table I can have dark borders with very high extinction ratios designed in this manner.

Figure 5:
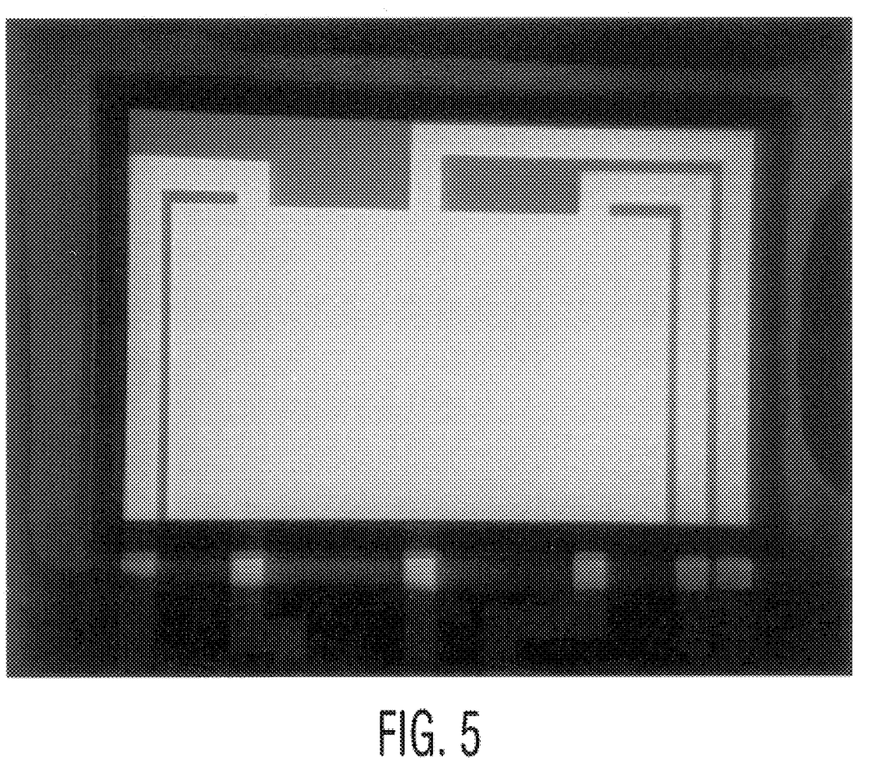
FIG. 5 is a photograph of a test cell constructed with a wide dam border structure of the invention.

FIG. 5 shows a test cell constructed with a dam according to the invention. In this case, a continuous border of ($SiN_x$) 0.5 mm wide was utilized to determine whether the cell could be filled properly. As can be determined by the photograph, a good uniform fill was achieved. In this test cell a 1000 A step was achieved by overlapping the ($SiN_x$) dam on the edge of the pixel metal. The difference in transmission determined by this step could be observed under the microscope. Contrast measured with respect to the bright state were on the order of 300 to 600:1 in various spots around the dam. The corners typically measured lower because the LC layer was thinner above the dam due to assembly stress in the two substrates.

The use of a continuous dam will also act to restrict the diffusion of LC contaminated by the edge seal material into the active region of the display. It is also important to note that the optical properties of this thin layer of LC above the ($SiN_x$) dam cannot be disturbed under normal display operating conditions. The series capacitance of the dam is approximately 10 times smaller than that of the thin LC layer above it. Thus, in order to achieve the 2V threshold for reorientation of the normally white LC more than 20 volts would need to be applied across this gap. Typical reorienting voltages in these types of systems are usually less than 10V.

The invention may be embodied in other specific forms without departing from the spirit and scope or essential characteristics thereof, the present disclosed examples being only preferred embodiments thereof.

We claim:

1. In a liquid crystal display device which comprises a layer of liquid crystalline material between a first and a second substrate, wherein the second substrate reflects light passing through the layer of liquid crystalline material, the improvement which comprises a border structure adjacent at least a portion of an active display area provided on said first substrate, said border structure being effective to shield areas of said first substrate of said display device from incident light and to render said shielded areas in a non-driven state dark to a viewer.

2. A display device which comprises at least one light source; a layer of liquid crystalline material between a first and a second substrate, which substrates are optionally provided with orientation means; means for guiding light from said at least one light source to the first substrate, the second substrate being provided with means for reflecting light passing the layer of liquid crystalline material; said display device further comprising polarizing means in a light path between the light source and the first substrate; and analyzing means in a light path, after reflection, between the liquid crystal display device and a display plane, wherein a portion of the liquid crystalline material is displaced by a dam comprising a substantially transparent, non-birefringent material, said dam forming a border structure adjacent the active area of the display device, said border structure being effective to shield areas of said first substrate of said display device from incident light to render said shielded areas in a non-driven state dark to a viewer.

3. A display device as claimed in claim 2, wherein said active area is a pixel array active area of said substrate.

4. A display device as claimed in claim 3, wherein said dam comprises $SiN_x$.

5. A display device as claimed in claim 4, wherein said border is a substantially continuous border which substantially surrounds the pixel array active area of the display device.

6. A display device as claimed in claim 5, wherein the liquid crystal display device is provided with a retardation foil.

7. A display device as claimed in claim 6, wherein a second layer of liquid crystalline material is present between said border and said second substrate.

8. A projection display device which comprises at least one light source whose light is incident on a display device as claimed in claim 2 and is reflected dependent on the optical state of pixels defined by picture electrodes surrounded by a substantially continuous border comprising a dam of non-birefringent material, the light thus modulated being imaged by projection means, the areas situated between the electrodes and other non-switching areas including electronics integrated along the edge of picture sections of said display device, being effectively shielded from the incident light and appearing substantially dark in the non-driven state.

9. A display device as claimed in claim 8, wherein the border comprises a dam of a photodefinable spacer material already present on the active plate as spacers.

10. A display device as claimed in claim 9, wherein the photodefinable spacer material already present on the active plate is $SiN_x$ which is also present as a spacer material between the pixels.

11. A display device as claimed in claim 10, wherein said substrates are sealed together using a glue seal and said border structure shields the areas of inactivity between the glue seal and the active region.

12. A display device as claimed in claim 11, wherein a thin layer of liquid crystal material is present on top of the dam.

13. A projection display device which comprises a light source; a reflective liquid crystal display device with a layer of liquid crystalline material, the molecules of which have a twist angle φ, between a first and a second substrate, which substrates are optionally provided with orientation means; means for guiding light from the light source to the first substrate, the second substrate being provided with means for reflecting light passing the layer of liquid crystalline material; said projection device further comprising polarizing means in a light path between the light source and the first substrate; and analyzing means in a light path, after reflection, between the liquid crystal display device and a display plane, wherein a portion of the liquid crystalline material is replaced by a dam comprising a substantially transparent, non-birefringent material, said dam forming a border structure which substantially surrounds the active area of the display device, said border structure being effective to shield areas of said first substrate of said display device from incident light to render said shielded areas dark to a viewer in a non-driven state.

14. A display device as claimed in claim 13, wherein the liquid crystal display device is provided with a retardation foil.

15. A display device as claimed in claim 13, wherein said active area is a pixel array active area of said substrate and a polarizing beam splitter comprises said polarizing means and said analyzing means.

16. A display device as claimed in claim 15, wherein said dam comprises $SiN_x$.

17. A display device as claimed in claim 16, wherein said border is a substantially continuous border which substantially surrounds a pixel array active area of the display device.

18. A display device as claimed in claim 17, wherein the border comprises a dam of a photodefinable spacer material already present on the active plate.

19. A display device as claimed in claim 18, wherein the photodefinable spacer material already present on the active plate is $SiN_x$ which is also present as a spacer material between the pixels.

20. A display device as claimed in claim 16, wherein said device comprises a compensation foil and a second layer of liquid crystalline material is present between said dam and said second substrate.

21. A reflective liquid crystal display device which comprises: a layer of liquid crystalline material, the molecules of which have a twist angle φ, between a first substrate having a first electrode, and a second substrate having a second electrode, which substrates are optionally provided with orientation means; the second substrate being provided with metal pixels for reflecting light passing the layer of liquid crystalline material; the edges of the substrates being joined to form a glue seal, a gap between the joined substrates being maintained by a spacer material; an external mask and a compensation foil positioned adjacent said first substrate;

wherein a portion of the liquid crystalline material is displaced by a dam comprising a substantially transparent, non-birefringent material; a layer of liquid crystalline material being present between said first substrate and said dam; said dam including a border structure which substantially surrounds the active area of the display effect and shields underlying areas from the incidental flux by means including a mirror metal light shield region which extends from a position beyond the outer edge of the glue seal inwardly to a position beyond the inner edge of the dam, and a routing metal shield region adjacent said dam and extending from and to portions of said liquid crystalline material positioned on either side of said dam; said dam being overlapped on the edge of the pixel metal to form a step effective to shield areas of said first substrate of said display device from incident light to render said shielded areas dark to a viewer in a non-driven state.

22. A display effect as claimed in claim 21, wherein the thickness of the mirror metal light shield is about 1000 A to 1500 A.

23. A reflective liquid crystal display device which comprises: a layer of liquid crystalline material between a first substrate having a first electrode, and a second substrate having a second electrode, which substrates are optionally provided with orientation means; the second substrate being provided with metal pixels for reflecting light passing the layer of liquid crystalline material; the edges of the substrates being joined to form a glue seal, a gap between the joined substrates being maintained by a spacer material; an external mask positioned adjacent said first substrate;

wherein a portion of the liquid crystalline material is displaced by a dam comprising a substantially transparent, non-birefringent material; said dam including a border structure which substantially surrounds the active area of the display effect and shields underlying areas from the incidental flux by means including a mirror metal light shield region which extends from a position beyond the outer edge of the glue seal inwardly to a position beyond the inner edge of the dam, and a routing metal shield region adjacent said dam and extending from and to portions of said liquid crystalline material positioned on either side of said dam; said dam being effective to shield areas of said first substrate of said display effect from incident light to render said shielded areas dark to a viewer in a non-driven state.

24. A display effect as claimed in claim 23, wherein the thickness of the mirror metal light shield is about 1000 A to 1500 A.

25. In a normally white, reflective liquid crystal display device which comprises a layer of liquid crystalline material between a first and a second substrate, wherein the second substrate reflects light passing through the layer of liquid crystalline material, the improvement which comprises a border structure adjacent at least a portion of an active display area provided on said first substrate, said border structure being effective to shield areas of said first substrate of said display device from incident light and to render said shielded areas in a non-driven state dark to a viewer.

26. A normally white, reflective liquid crystal device which comprises at least one light source; a layer of liquid crystalline material between a first and a second substrate, which substrates are optionally provided with orientation means; means for guiding light from said at least one light source to the first substrate, the second substrate being provided with means for reflecting light passing the layer of liquid crystalline material; said liquid crystal device further comprising polarizing means in a light path between the light, source and the first substrate; and analyzing means in a light path, after reflection, between the liquid crystal display device and a display plane, wherein a portion of the liquid crystalline material is displaced by a dam comprising a substantially transparent, non-birefringent material, said dam forming a border structure adjacent the active area of the display device, said border structure being effective to shield areas of said first substrate of said display device from incident light to render said shielded areas in a non-driven state dark to a viewer.

27. A display device as claimed in claim 26, wherein said active area is a pixel array active area of said substrate.

28. A display device as claimed in claim 27, wherein said dam comprises $SiN_x$.

29. A display device as claimed in claim 28, wherein said border is a substantially continuous border which substantially surrounds the pixel array active area of the display device.

30. A display device as claimed in claim 29, wherein the liquid crystal display device is provided with a retardation foil.

31. A display device as claimed in claim 30, wherein a second layer of liquid crystalline material is present between said border and said second substrate.

32. A projection display device which comprises at least one light source whose light is incident on a display device as claimed in claim 26 and is reflected dependent on the optical state of pixels defined by picture electrodes surrounded by a substantially continuous border comprising a dam of non-birefringent material, the light thus modulated being imaged by projection means, the areas situated between the electrodes and other non-switching areas including electronics integrated along the edge of picture sections of said display device, being effectively shielded from the incident light and appearing substantially dark in the non-driven state.

33. A display device as claimed in claim 32, wherein the border comprises a dam of a photodefinable spacer material already present on the active plate as spacers.

34. A display device as claimed in claim 33, wherein the photodefinable spacer material already present on the active plate is $SiN_x$ which is also present as a spacer material between the pixels.

35. A display device as claimed in claim 34, wherein said substrates are sealed together using a glue seal and said border structure shields the areas of inactivity between the glue seal and the active region.

36. A display device as claimed in claim 35, wherein a thin layer of liquid crystal material is present on top of the dam.

37. A normally white liquid crystal display device which comprises: a layer of liquid crystalline material, the molecules of which have a twist angle $\square$, between a first substrate having a first electrode, and a second substrate having a second electrode, which substrates are optionally provided with orientation means;

wherein a portion of the liquid crystalline material is displaced by a dam comprising a substantially transparent, non-birefringent material; said dam forming a border structure effective to shield areas of said first substrate of said display device from incident light to render said shielded areas dark to a viewer in a non-driven state.

38. A reflective normally white liquid crystal display device which comprises:

a layer of liquid crystalline material between a first substrate having a first electrode, and a second substrate having a second electrode, which substrates are optionally provided with orientation means; the second substrate being provided with metal pixels for reflecting light passing the layer of liquid crystalline material; the edges of the substrates being joined to form a glue seal, a gap between the joined substrates being maintained by a spacer material; an external mask positioned adjacent said first substrate;

wherein a portion of the liquid crystalline material is displaced by a dam comprising a substantially transparent, non-birefringent material; said dam including a border structure which substantially surrounds the active area of the display effect and shields underlying areas from the incidental flux by means including a mirror metal light shield region which extends from a position beyond the outer edge of the glue seal inwardly to a position beyond the inner edge of the dam, and a routing metal shield region adjacent said dam and extending from and to portions of said liquid crystalline material positioned on either side of said dam; said dam being effective to shield areas of said first substrate of said display effect from incident light to render said shielded areas dark to a viewer in a non-driven state.

* * * * *